US006900580B2

(12) United States Patent
Dai et al.

(10) Patent No.: US 6,900,580 B2
(45) Date of Patent: May 31, 2005

(54) SELF-ORIENTED BUNDLES OF CARBON NANOTUBES AND METHOD OF MAKING SAME

(75) Inventors: Hongjie Dai, Sunnyvale, CA (US); Shoushan Fan, Beijing (CN); Michael Chapline, Alamo, CA (US); Nathan Franklin, Menlo Park, CA (US); Thomas Tombler, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 96 days.

(21) Appl. No.: 09/858,783

(22) Filed: May 15, 2001

(65) Prior Publication Data

US 2001/0019238 A1 Sep. 6, 2001

Related U.S. Application Data

(63) Continuation of application No. 09/191,728, filed on Nov. 12, 1998, now Pat. No. 6,232,706.

(51) Int. Cl.[7] .................................................. H01J 9/24
(52) U.S. Cl. ........................ 313/309; 313/310; 313/336; 313/351; 445/50
(58) Field of Search .......................... 313/309–311, 336, 313/346 R, 351, 495–497; 445/24, 50–51; 257/768, 757; 427/58, 255.6, 255.7, 384, 376.1, 508, 521, 577–78, 579, 249.5, 255.1; 437/31, 186; 204/298.02, 298.04, 192.38, 180.6, 192.1

(56) References Cited

U.S. PATENT DOCUMENTS

| 4,272,699 | A | * | 6/1981 | Faubel et al. | ............... 313/360 |
| 5,668,405 | A | * | 9/1997 | Yamashita | ................... 257/668 |
| 5,697,827 | A | * | 12/1997 | Rabinowitz | .................. 445/50 |

(Continued)

FOREIGN PATENT DOCUMENTS

| EP | 0913508 | 10/1988 | ........... D01F/9/127 |
| EP | 0 838 831 A | 4/1998 | |
| EP | 0 913 508 A | 5/1999 | |
| EP | 0 951 047 A | 10/1999 | |
| WO | 9805920 | 2/1998 | ........... G01B/7/134 |
| WO | WO 99 65821 A | 12/1999 | |

OTHER PUBLICATIONS

Pan e t al., "Very Long Carbon Nanotubes," Nature, vol. 394, Aug. 13, 1998, pp. 631–632.

(Continued)

*Primary Examiner*—Joseph Williams

(57) ABSTRACT

A field emission device having bundles of aligned parallel carbon nanotubes on a substrate. The carbon nanotubes are oriented perpendicular to the substrate. The carbon nanotube bundles may be up to 300 microns tall, for example. The bundles of carbon nanotubes extend only from regions of the substrate patterned with a catalyst material. Preferably, the catalyst material is iron oxide. The substrate is preferably porous silicon, as this produces the highest quality, most well-aligned nanotubes. Smooth, nonporous silicon or quartz can also be used as the substrate. The method of the invention starts with forming a porous layer on a silicon substrate by electrochemical etching. Then, a thin layer of iron is deposited on the porous layer in patterned regions. The iron is then oxidized into iron oxide, and then the substrate is exposed to ethylene gas at elevated temperature. The iron oxide catalyzes the formation of bundles of aligned parallel carbon nanotubes which grow perpendicular to the substrate surface. The height of the nanotube bundles above the substrate is determined by the duration of the catalysis step. The nanotube bundles only grow from the patterned regions.

20 Claims, 3 Drawing Sheets

U.S. PATENT DOCUMENTS

| | | | | |
|---|---|---|---|---|
| 5,725,524 A | * | 3/1998 | Mulier et al. | 313/309 |
| 5,726,524 A | * | 3/1998 | Debe | 313/309 |
| 5,773,834 A | * | 6/1998 | Yamamoto et al. | 250/423 F |
| 5,773,921 A | * | 6/1998 | Keesmann et al. | 313/309 |
| 5,872,422 A | * | 2/1999 | Xu et al. | 313/311 |
| 5,973,444 A | * | 10/1999 | Xu et al. | 313/309 |
| 6,097,138 A | * | 8/2000 | Nakamoto | 313/309 |

OTHER PUBLICATIONS

Li et al., "Large–Scale Synthesis of Aligned carbon Nanotubes," Science, vol. 274, Dec. 6, 1996, pp. 1701–1703.

Fan et al., "Self–Oriented Regular Arrays of Carbon Nanotubes and Their Field Emission Properties," Science, vol. 283, Jan. 22, 1999, pp. 512–514.

Tsai e t al., "Bias Enhanced Nucleation and Growth of The Aligned Carbon Nanotubes with Open Ends Under Microwave Plasma Synthesis," Applied Physics Letters, vol. 74, No. 23, Jun. 7, 1999, pp. 3462–3464.

Copy of International Search Report of PCT/us99/26232, which is the PCT application of U.S. application No. 09/191,728.

* cited by examiner

# SELF-ORIENTED BUNDLES OF CARBON NANOTUBES AND METHOD OF MAKING SAME

CROSS-REFERENCE TO RELATED APPLICATIONS

This application is a continuation of patent application 09/191,728, now U.S. Pat. No. 6,232,706, filed Nov. 12, 1998, which is herein incorporated by reference, to which priority is claimed under 35 U.S.C. §120.

FIELD OF THE INVENTION

This invention relates generally to carbon nanotubes. The present invention also relates to methods for making bundles of aligned carbon nanotubes. The present invention is also related to carbon nanotube field emission devices such as used in flat panel displays.

BACKGROUND

Field emission devices have potential applications in flat panel displays. Field emitters used in flat panel displays must be stable, long lasting and should have a relatively uniform emission over the surface of the display.

Carbon nanotubes are very small tube-shaped molecules having the structure of a graphite molecule rolled into a tube. Carbon nanotubes are electrically conductive along their length, chemically stable, and can have very small diameters (much less than 100 nanometers) and large aspect ratios (length/diameter). Due to these properties and other properties, it has been suggested that carbon nanotubes can be used as field emission devices.

However, it has been unclear how to realize a field emission device exploiting carbon nanotubes. They are difficult to work with in bulk, and, on a microscopic level, often form an impossibly tangled mess resembling a hairball. To produce a useful field emission device for flat panel displays, the carbon nanotubes should be patterned into individual field emitters. A problem with present methods of making carbon nanotube field emitters is that it is not clear how to pattern the carbon nanotube to provide arrays of emitters.

U.S. Pat. No. 5,773,921 to Keesman et al. discloses a field emission device which employs sharp-edged graphite wafers. Carbon nanotubes are disposed on the sharp edge of the graphite wafers and help to increase field emission. The carbon nanotubes are disposed on the graphite wafers by sputtering a nearby graphite target. The carbon nanotubes are not aligned in any way.

U.S. Pat. No. 4,272,699 to Faubel et al. discloses an ion source which uses carbon fiber field emitters. The carbon fibers are bundled together and an electric field is applied to the bundle. The carbon fibers are held by a macroscopic mechanical device that holds the fibers parallel. Such a mechanical device cannot be used with carbon nanotubes, which are orders of magnitude smaller than the carbon fibers used by Faubel et al.

U.S. Pat. No. 5,773,834 to Yamamoto et al. describes a method of making carbon nanotubes on the surface of a carbon-containing substrate by ion bombardment. The carbon nanotubes produced can be used as field emitters. The carbon nanotubes produced according to Yamamoto are not aligned, and in particular, are not aligned perpendicular to the substrate. Also, Yamamoto does not disclose how to pattern the substrate to provide individual field emitters.

Yet another problem with present methods for making carbon nanotube field emitters is that scale-up to large wafers is difficult or not possible.

There exists a need in the art for a method of producing aligned carbon nanotubes. In particular, such aligned carbon nanotubes can be used as superior field emission devices.

SUMMARY OF THE INVENTION

Accordingly, the present invention is directed to providing:

1) a method of making aligned bundles of carbon nanotubes; and 2) a field emission device using aligned bundles of carbon nanotubes as field emitters;

3) a field emission device that can have arrays of emitters;

4) a method of making field emitters that can be scaled to large substrates.

These and other objects and advantages will be apparent upon reading the following description and accompanying drawings.

These and other advantages will be apparent upon reading the following description and accompanying drawings.

SUMMARY

In one example embodiment of the present invention, a field emission device includes a refractory substrate composed of silicon or quartz, a catalyst material on top of the substrate, and a bundle of aligned parallel carbon nanotubes extending from the catalyst material in a direction perpendicular to the substrate.

In one example embodiment of the present invention, the substrate has a top layer of porous silicon, with the catalyst material disposed on the porous layer. Particularly, the porous layer can be composed of an upper nanoporous layer with small pores on top of a macroscopic porous layer with larger pores. The catalyst material is iron oxide.

The substrate may also have a smooth, nonporous surface, or a rough surface.

The carbon nanotube bundles may be within 10–22 nanometers in diameter and may be up to 300 microns tall. Also, the carbon nanotubes be multi-walled.

In another example embodiment of the present invention, the catalyst material is confined to a patterned region. This results in the bundle extending from the patterned region. The bundle has the same footprint size and shape as the patterned region of the catalyst material.

The carbon nanotube bundles may have a flat top, or a bowl-shaped top.

The present invention also includes a method of making bundles of aligned carbon nanotubes on a substrate of silicon or quartz. The method includes the steps of depositing a catalyst material on a top surface of the substrate, and then exposing the substrate to a carbon containing gas.

In one implementation, the substrate is a silicon substrate with a porous top surface. The top surface may be made porous by electrochemical etching. In another example embodiment of the present invention, the catalyst material is iron oxide. The iron oxide may be deposited by depositing a thin film of iron, and then oxidizing the iron film. The iron film may be oxidized by exposing it to oxygen at elevated temperature. In one particular instance, the original iron film is bout 5 nanometers thick.

The carbon containing gas may be ethylene.

The above summary of the present invention is not intended to describe each illustrated embodiment or every implementation of the present invention. The figures and detailed description that follow more particularly exemplify these embodiments.

DESCRIPTION OF THE FIGURES

The invention may be more completely understood in consideration of the detailed description of various embodiments of the invention that follows in connection with the accompanying drawings, in which.

Figure 1:
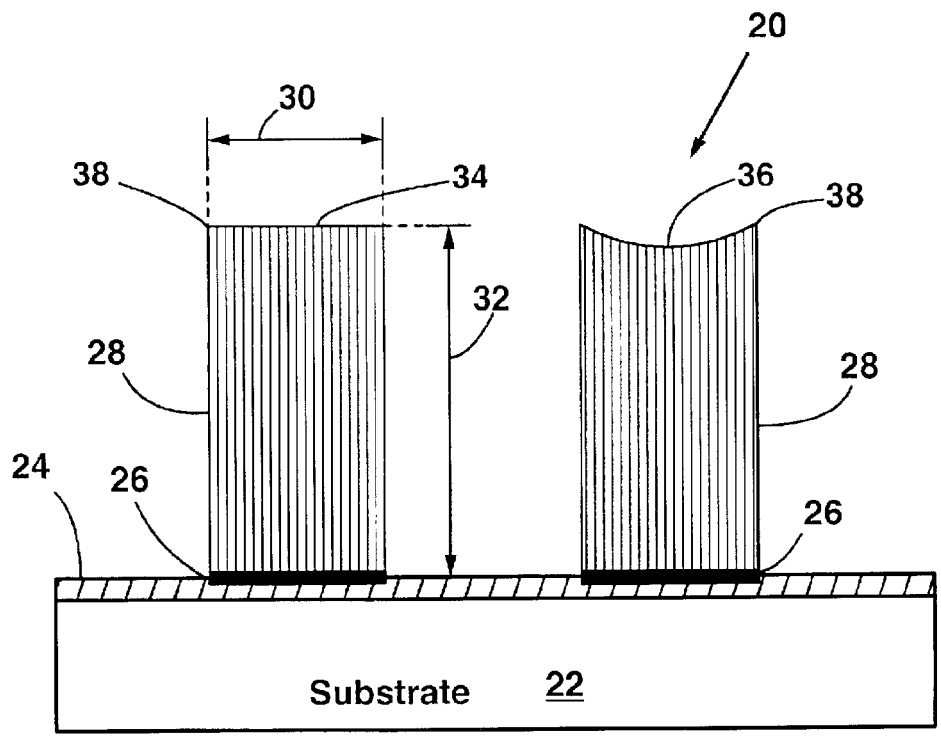
FIG. 1 shows a field emission device, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of devices, and the invention has been found to be particularly suited for field emission devices and other devices employing carbon nanotubes. While the present invention is not necessarily limited to such applications, various aspects of the invention may be appreciated through a discussion of various examples using this context.

FIG. 1 shows a field emission device 20 according to an example embodiment of the present invention. The device has a substrate 22 with a porous top layer 24. The substrate 22 and top layer 24 are made of silicon, although other substrate materials can also be used. Disposed on the porous top layer 24 are patterns of catalyst material 26. In one instance, the catalyst material 26 is a thin film of iron oxide. Extending from the catalyst material patterns 26 are carbon nanotube bundles 28, which are perpendicular to the substrate 22. The carbon nanotubes comprising the bundles are parallel and perpendicular to the substrate 22. The carbon nanotubes comprising the bundles are typically about 10–22 nanometers in diameter.

The bundles 28 may be about 10–250 microns wide 30, and up to or exceeding 300 microns in height 32. The nanotube bundles have the same width 30 as the catalyst material patterns 26. More generally, the bundles 28 have the same 'footprint' size and shape as the catalyst material patterns 26. The nanotube bundles 28 can have a flat top 34, or can have a bowl-shaped top 36, depending on the process parameters used to make the nanotube bundles. There are no individual stray nanotubes extending away from the blocks.

The nanotube bundles 28 have sharp edges 38 and corners that serve as field emission regions. Since the substrate can be conductive (e.g. doped silicon) and the nanotubes are conductive along their length (parallel with height 32), electrical connections to the bundles 28 are made simply by connecting to the substrate 22.

Figure 2:
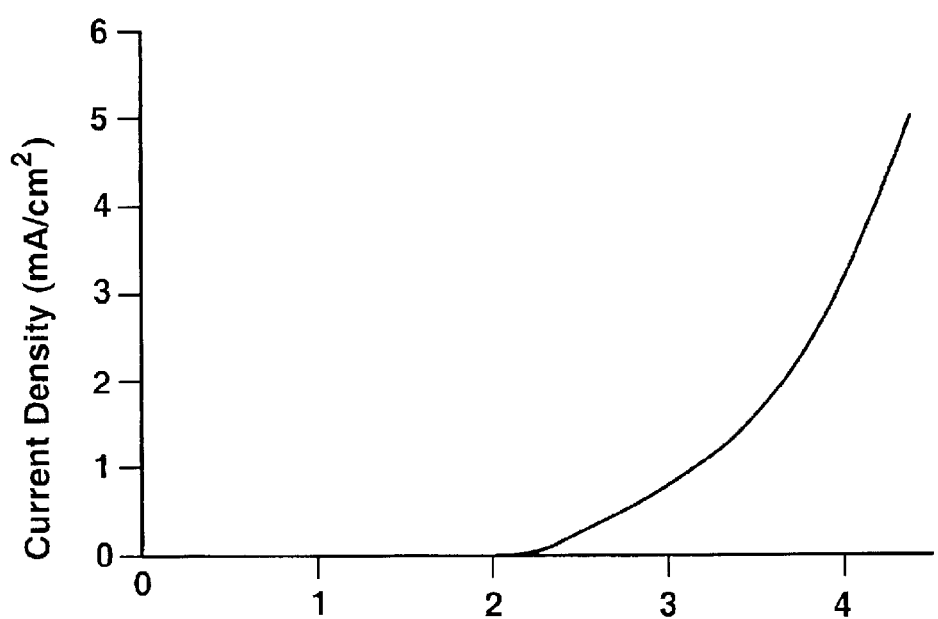
FIG. 2 shows a graph of field emission characteristics of a field emission device, according to another example embodiment of the present invention.

FIG. 2 shows field emission characteristics for four nanotube bundles on a $n^+$ type silicon substrate. The bundles each have a footprint of 250 microns×250 microns and are 160 microns tall. The anode is an aluminum coated silicon wafer 200 microns above the substrate. The data is taken in a vacuum chamber at $3\times10^{-7}$ Torr base pressure. Note that the electric field is computed by using the applied voltage divided by the distance from the tops of the bundles to the anode (40 microns). The current density reaches 10 mA/cm$^2$ at an electric field strength of 5 volts/micron. After continuous emission for a week at 2 mA/cm$^2$ the bundles show no indication of damage under a scanning electron microscope.

Figure 3:
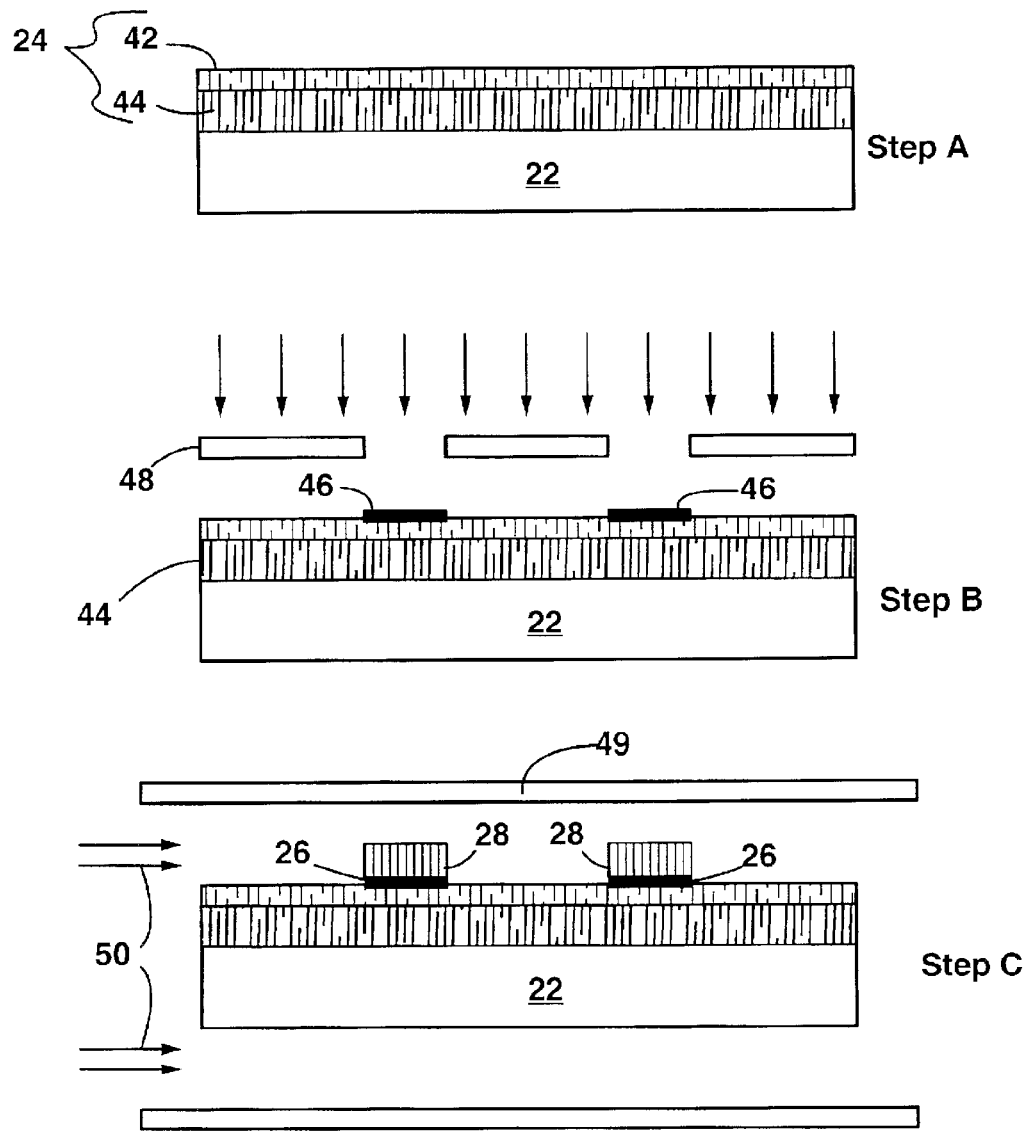
FIG. 3 illustrates a method for making bundles of aligned carbon nanotubes on a porous silicon substrate, according to another example embodiment of the present invention.

The present invention includes methods of making the carbon nanotube bundles attached to substrates. FIG. 3 illustrates a preferred method for making the nanotube bundles. First, in step A, a highly P-doped $n^+$ type silicon substrate 22 (100 top surface, resistivity 0.008–0.018 Ohm-cm) is electrochemically etched in 1:1 HF (49% in water) ethanol with an anodization current density of 10 mA/cm$^2$ (typical etching time is 5 minutes). This forms a thin nanoporous layer 42 (pore size~3 nanometers) on top of a macroporous layer 44 (pore size~100 nanometers). Layers 42, 44 are generally referred to as a porous layer 24 in FIG. 1. Next, in step B, the porous layer 42 is patterned with a 5 nanometer thick iron film 46 by e-beam evaporation through a shadowmask 48. After deposition of iron, the substrate is annealed in air at 300° C. overnight. This annealing step oxidizes the surface of the silicon as well as the iron, converting the iron patterns 46 into catalytically active iron oxide patterns 26. The resulting silicon dioxide layer formed on the porous silicon prevents the porous structure of layers 42, 44 from collapsing during the following high temperature chemical vapor deposition (CVD) step. Next, in step C, the substrate 22 is placed in a 2-inch tube reactor 49 housed in a tube furnace. The furnace is heated to 700° C. in flowing argon. Then, at 700° C., the argon supply is turned off, and ethylene 50 is flown through the tube reactor at a rate of 1000 sccm/min for 15–60 minutes. The boat for the substrates is sealed at one end, and the sealed end is placed downstream in the furnace. While ethylene 50 is flowing, the iron oxide patterns 26 catalyze the growth of carbon nanotube bundles 28 which grow perpendicular to the substrate 22. The width of the bundles 28 is the same as the width of the iron oxide patterns 26.

The above method for making nanotube bundles produces mainly flat-top bundles, although sometimes bowl-shaped bundles are also produced. Bowl-shaped bundles are produced when nanotubes in the middle of a bundle grow slower than the nanotubes at the outer edges of a bundle.

The height of the bundles 28 is determined by the duration that the substrates are exposed to ethylene at high temperature. In a particular experiment conducted by applicants, reaction times of 5, 15, 30, and 60 minutes produced bundles 31, 98, 163, and 240 microns tall, respectively. The growth rate is observed to be linear initially and then falls off at longer reaction times. As the aspect ratio (height:width) of the bundles approaches 5:1, some bundles may become tilted, but refuse to fall down.

The bundles can have footprint sizes as small as 2 microns on a side and be 15 microns tall, and still remain standing on the substrate.

Since the carbon nanotubes grow only from those regions that have deposited iron oxide, patterning the iron oxide results in carbon nanotubes growing only from those regions with iron oxide. This provides accurate control of the size, shape, and distribution of the bundles on the substrate surface. As a particular advantage, patterning of the catalyst provides the ability to fabricate arrays of individual field emitters. Each bundle can provide field emission for a single pixel in a flat panel display. Each bundle can be individually controlled by connecting patterned metallization lines to the bundles. Further, the arrays can be formed on large substrates. The size of the substrate is only limited by the size of the tube furnace. The substrate can be several inches across, for example. Many field emitter arrays have been fabricated on 3 cm×3 cm silicon substrates.

The method of the present invention produces carbon nanotube bundles having a high density. The nanotubes are held together by Van der Waals interactions. The nanotubes grown according to the present method are in the size range of about 16±6 nanometers and are aligned parallel in a direction perpendicular to the substrate 22. The carbon nanotubes are aligned perpendicular to the substrate regardless of the orientation of the substrate in the furnace. The carbon nanotubes are generally multi-walled.

The porous layer acts as an excellent catalyst support. During the 300° C. annealing step, iron oxide particles form with a narrow size distribution due to their strong interactions with the porous layer. The strong interactions also prevent the iron oxide particles from sintering at elevated temperatures.

It has been confirmed by the applicants that the nanotube bundles grow in 'base growth' mode. This has been established by physically removing nanotube bundles from the substrate and observing that the substrates remain capable of growing carbon nanotubes (i.e. the iron oxide catalyst patterns remain on the substrate).

The present method of growing aligned nanotubes is very different from prior art approaches of growing aligned nanotubes. In prior art approaches, carbon nanotube alignment is provided by confining the growth of nanotubes to channels in porous silica or the channels of alumina membranes. In the present method, the carbon nanotubes are self aligned, without being confined to a channel, pore, or hole. The carbon nanotubes of the present method spontaneously align themselves in free space.

It is important to note that the holes and pores in the porous layers 42, 44 are not aligned or oriented in any way. For example, they are not necessarily aligned perpendicular to the substrate 22. The holes and pores of the porous layer 24 generally have random orientations.

Figure 4:
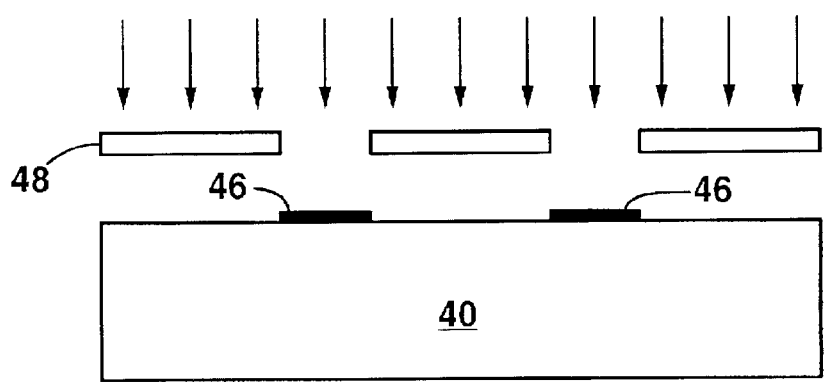
FIG. 4 illustrates a method for making bundles of aligned carbon nanotubes on a smooth, nonporous silicon substrate, according to another example embodiment of the present invention.

The present invention also includes a method of producing aligned carbon nanotubes on a nonporous smooth silicon substrate. The present method for growing aligned carbon nanotubes on nonporous silicon substrates is largely the same as the method for porous substrates. FIG. 4 illustrates a first step in the present method for producing aligned carbon nanotube bundles on a smooth nonporous silicon substrate 40. A thin film (e.g. 5 nanometers thick) of iron 46 is deposited through a shadowmask 48 using the same technique as in step B of FIG. 3. The nonporous substrate 40 has a native oxide layer which is left intact prior to the iron deposition. The 300° C. annealing and 700° C. CVD nanotube growth steps for nonporous substrates 40 are the same as in the method described above for porous substrates. The CVD process forms carbon nanotube bundles which extend from iron oxide patterns perpendicularly to the nonporous substrate 40.

The overall features of carbon nanotubes grown on nonporous silicon are similar to the features of nanotubes grown on porous silicon. However, in contrast to porous silicon substrates, nanotube bundles with aspect ratios greater than 5 tend to fall onto the substrate 40. Nanotube bundles grown on smooth nonporous substrates are not as strongly bound to the substrate. Also, carbon nanotube bundles grown on nonporous silicon substrates tend to have higher defect densities, and tend to be less well aligned than bundles grown on porous silicon. Further, carbon nanotubes grow about 50% faster on porous silicon compared to nonporous silicon. For these reasons, the use of porous silicon substrates is highly preferred.

Figure 5:
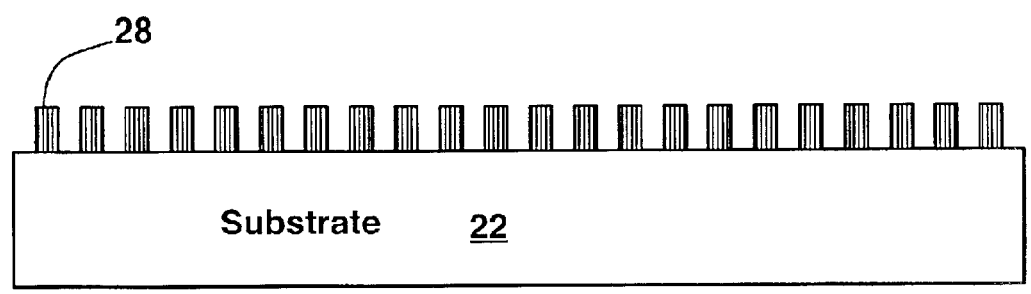
FIG. 5 shows a field emission device with many nanotube bundles, each bundle providing field emission to illuminate a single pixel in a flat panel display, according to another example embodiment of the present invention.

FIG. 5 shows a field emission device that can be used in a flat panel display. The device has many carbon nanotube bundles 28. Each bundle 28 can provide field emission for a single pixel in a flat panel display.

It is also noted that the iron catalyst does not necessarily need to be deposited using physical vapor deposition techniques, although this is preferred. For example, catalyst materials can be deposited as iron salts dissolved in a carrier solvent. The solvent is then deposited on the substrate and allowed to dry, leaving the iron salt. The iron salt may then need to be 'activated' by exposing it to high temperature so that it decomposes into active catalyst material.

It is also noted that the substrate does not necessarily need to be silicon, although silicon, and particularly, porous silicon, is preferred. The substrate can also be quartz. In the present application, silicon, porous silicon, and quartz are understood to be refractory materials.

The present method for making bundles of aligned carbon nanotubes may also work on substrates such as ceramics, alumina, sapphire, and silica, for example. The substrate must be able to tolerate the high temperatures (about 700° C.) used in the CVD process without meting or disintegrating. For best results, the substrate should have a rough and complex surface topology.

It is also noted that the substrate can have a rough texture which is neither smooth nor 'porous'. Generally, however, extremely complex substrate surface topologies are preferred because they produce fast growing nanotubes with few defects that are strongly bound to the substrate.

It will be clear to one skilled in the art that the above example embodiments may be altered in many ways without departing from the scope of the invention. Accordingly, such changes and implementations do not depart from the spirit and scope of the present invention, which is set forth in the following claims.

What is claimed is:

1. A field emission device comprising:
   a) a substrate;
   b) a catalyst material on a porous surface of the substrate;
   c) one or more bundles of parallel carbon nanotubes extending from the catalyst material in a direction perpendicular to the substrate;
   wherein the substrate comprises a material selected from the group consisting of ceramics, alumina, sapphire, and silica.

2. A method of making bundles of aligned carbon nanotubes on a porous surface of a substrate, the method comprising the steps of:
   a) e-beam evaporating a catalyst material through a shadowmask on the porous surface such that one or more patterned regions are produced; and
   b) exposing the catalyst material to a carbon containing gas at an elevated temperature such that one or more bundles of parallel carbon nanotubes grow from the one or more patterned regions in a direction substantially perpendicular to the substrate.

3. A field emission device comprising:

a catalyst material deposited in an ordered arrangement on a porous surface of a substrate; and at least one carbon nanotube extending from the catalyst material in a direction substantially perpendicular to the substrate.

4. The field emission device of claim 3, wherein the at least one carbon nanotube includes a plurality of substantially parallel carbon nanotubes extending from the catalyst material in a direction substantially perpendicular to the substrate.

5. The field emission device of claim 3, wherein the at least one carbon nanotube includes a bundle of substantially parallel carbon nanotubes extending from the catalyst material in a direction substantially perpendicular to the substrate.

6. The field emission device of claim 3, wherein the substrate comprises a material selected from the group consisting of ceramics, alumina, sapphire, and silica.

7. The field emission device of claim 3, wherein the substrate includes a patterned region.

8. The field emission device of claim 3, wherein the at least one carbon nanotube has a diameter of less than about 22 nanometers.

9. The field emission device of claim 3, wherein the at least one carbon nanotube is multi-walled.

10. The field emission device of claim 3, wherein the at least one carbon nanotube comprises at least one graphite molecule rolled into a tube.

11. The field emission device of claim 3, wherein growing at least one carbon nanotube includes forming a field emitter comprising the at least one carbon nanotube.

12. The field emission device of claim 3, wherein the at least one carbon nanotube has an edge portion that is a field emission region.

13. The field emission device of claim 3, wherein the porous surface comprises randomly-oriented pores.

14. A method of making carbon nanotubes on a porous surface of a substrate, the method comprising the steps of:

forming at least one patterned catalyst region on the porous surface; and exposing the catalyst to a carbon containing gas at an elevated temperature and growing at least one carbon nanotube from the at least one patterned region in a direction substantially perpendicular to the substrate.

15. The method of claim 11, wherein growing at least one carbon nanotube includes growing a bundle of aligned carbon nanotubes.

16. The method of claim 14, wherein growing at least one carbon nanotube includes growing a plurality of substantially parallel carbon nanotubes extending from the catalyst in a direction substantially perpendicular to the substrate.

17. The method of claim 14, wherein growing at least one carbon nanotube includes forming a field emitter portion of a field emission device.

18. The method of claim 14, wherein forming at least one patterned catalyst region on the porous surface includes e-beam evaporating a catalyst material through a shadow-mask on the porous surface and producing the at least one patterned catalyst region.

19. A field emission device comprising:

a catalyst material deposited in an ordered arrangement on a porous substrate; and at least one carbon nanotube extending from the catalyst material in a direction substantially perpendicular to the substrate.

20. The field emission device of claim 19, wherein the nanotube includes a carbon molecule having a tubular form.

* * * * *